United States Patent
Van Horssen

(10) Patent No.: US 8,641,336 B1
(45) Date of Patent: Feb. 4, 2014

(54) TOOL HOLDER AND CUTTING TOOL

(76) Inventor: Charles A. Van Horssen, Scottsdale, AZ (US)

( * ) Notice: Subject to any disclaimer, the term of this patent is extended or adjusted under 35 U.S.C. 154(b) by 0 days.

(21) Appl. No.: 13/208,973

(22) Filed: Aug. 12, 2011

(51) Int. Cl.
*B23B 31/107* (2006.01)

(52) U.S. Cl.
USPC ............... 408/239 R; 279/82; 279/93; 279/97

(58) Field of Classification Search
USPC .......... 408/239 R; 279/65, 76, 81, 82, 86, 93, 279/97, 19.4–19.7
IPC ..................................................... B23B 31/107
See application file for complete search history.

(56) References Cited

U.S. PATENT DOCUMENTS

| | | | |
|---|---|---|---|
| D34,124 S | 3/1901 | Aylmer | |
| 1,269,315 A | 6/1918 | Sault | |
| 1,434,782 A | 11/1922 | Lange et al. | |
| 1,986,494 A * | 1/1935 | Battaline | 279/135 |
| D133,203 S | 7/1942 | Beyreis | |
| 2,405,961 A * | 8/1946 | Lapointe | 279/79 |
| 2,960,343 A * | 11/1960 | Elledge | 279/81 |
| 3,289,273 A | 12/1966 | Artaud | |
| 3,299,752 A | 1/1967 | Cashman | |
| 3,303,728 A | 2/1967 | Testa | |
| 3,658,352 A | 4/1972 | Koch et al. | |
| 3,747,946 A * | 7/1973 | Edens | 279/81 |
| 3,934,320 A | 1/1976 | McCreery | |
| 4,034,452 A | 7/1977 | Edming | |
| D246,524 S | 11/1977 | Lauber | |
| 4,127,063 A * | 11/1978 | Peterson et al. | 101/3.1 |
| D251,971 S | 5/1979 | Bator | |
| 4,285,618 A | 8/1981 | Shanley, Jr. | |
| 4,330,229 A | 5/1982 | Croydon | |
| 4,334,446 A | 6/1982 | Field | |
| 4,402,519 A * | 9/1983 | Meaden et al. | 279/76 |
| 4,412,763 A | 11/1983 | Shallenberger, Jr. | |
| D273,387 S | 4/1984 | Lassiter | |
| 4,588,335 A * | 5/1986 | Pearson, Jr. | 408/239 R |
| 4,594,036 A * | 6/1986 | Hogenhout | 408/240 |
| D285,343 S | 8/1986 | Duarte-Martins, Jr. | |
| D289,252 S | 4/1987 | Albright et al. | |
| D293,914 S | 1/1988 | Hudson | |
| 4,754,787 A | 7/1988 | Smith | |
| 4,844,669 A | 7/1989 | Tsujimura et al. | |
| D305,498 S | 1/1990 | Lassiter | |
| 5,000,631 A * | 3/1991 | Deutschenbaur et al. | 408/240 |
| D318,994 S | 8/1991 | Stewart | |
| 5,137,065 A | 8/1992 | Stewart | |
| D334,016 S | 3/1993 | Jonsson et al. | |
| D338,678 S | 8/1993 | Mihic | |

(Continued)

OTHER PUBLICATIONS chestofbooks.com website images, attached, retrieved Mar. 14, 2011.

*Primary Examiner* — Eric A Gates
(74) *Attorney, Agent, or Firm* — Adam R. Stephenson, Ltd.

(57) ABSTRACT

A tool holder. Implementations include a base unit which receives a shank of a cutting tool. A dowel movably coupled to the base unit engages an indentation in the shank under spring bias force to removably couple the cutting tool with the base unit. A sleeve slidably couples over the base unit, the sliding of which causes the dowel to ride in a first slot in the base unit and simultaneously in a second slot in the sleeve, causing the dowel to engage the indentation when the sleeve is slid in one direction and disengage the indentation when the sleeve is slid the opposite direction.

8 Claims, 4 Drawing Sheets

(56) References Cited

U.S. PATENT DOCUMENTS

| | | | |
|---|---|---|---|
| 5,340,129 A * | 8/1994 | Wright | 279/90 |
| 5,682,933 A | 11/1997 | Martel | |
| 5,967,713 A | 10/1999 | Watzke | |
| D416,029 S | 11/1999 | Cosic | |
| 6,135,462 A | 10/2000 | Robison | |
| 6,206,432 B1 | 3/2001 | Kamiyama | |
| 6,253,812 B1 | 7/2001 | Rinehart | |
| 6,457,916 B2 | 10/2002 | Wienhold | |
| 6,474,656 B1 * | 11/2002 | Thomas | 279/30 |
| 6,543,959 B1 | 4/2003 | Jore | |
| 6,561,523 B1 | 5/2003 | Wienhold | |
| 6,942,438 B1 | 9/2005 | Deguise | |
| D526,669 S | 8/2006 | McCoppin | |
| D544,004 S | 6/2007 | Janness | |
| D570,663 S | 6/2008 | Duggan | |
| 7,387,479 B1 | 6/2008 | Lee | |
| D574,403 S | 8/2008 | Brady | |
| D579,033 S | 10/2008 | Miller et al. | |
| D580,462 S | 11/2008 | Liao et al. | |
| D600,260 S | 9/2009 | Frejd | |
| D613,318 S | 4/2010 | Frejd | |
| D620,034 S | 7/2010 | Sjoo | |
| 7,789,601 B2 * | 9/2010 | Prince et al. | 409/219 |
| D626,575 S | 11/2010 | Washington, III | |
| D627,809 S | 11/2010 | Kammerer | |
| 7,824,137 B2 | 11/2010 | Vasudeva et al. | |
| 2009/0273146 A1 * | 11/2009 | Dezheng et al. | 279/78 |
| 2009/0279972 A1 | 11/2009 | Novak et al. | |

* cited by examiner

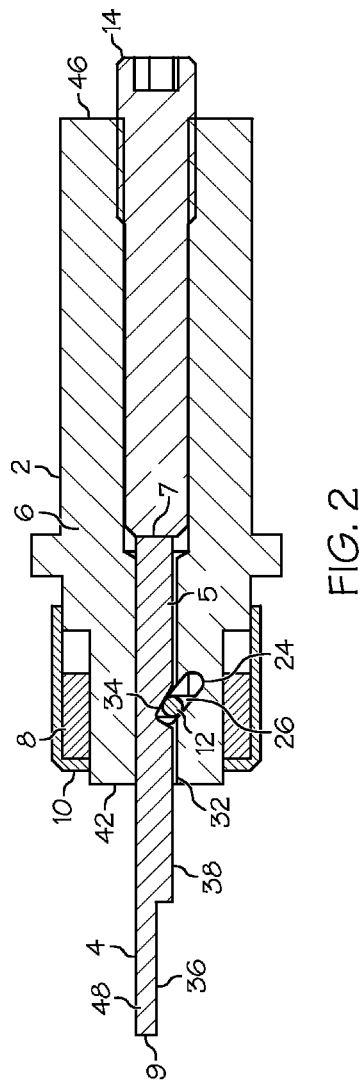
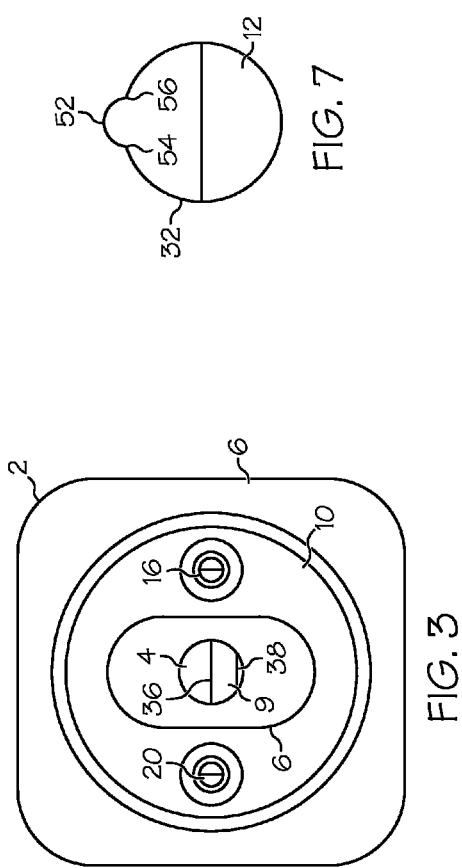

TOOL HOLDER AND CUTTING TOOL

BACKGROUND

1. Technical Field

Aspects of this document relate generally to cutting tools and tool holders for holding the same during operation. More specific implementations involve cutting tools for machining processes and holders for the same.

2. Background Art

Various cutting tools are used for the machining of various parts. Cutting tools come in many shapes, sizes, materials and configurations according to the specific material or item to be cut and depending on the desired requirements of the cutting tool itself such as hardness, wear resistance, toughness, and the like. Conventional tool holders hold a cutting tool until it is worn whereupon the user must replace the cutting tool with another to continue operation within desired parameters.

SUMMARY

Implementations of tool holders may include: a base unit configured to receive a shank of a cutting tool; and a dowel movably coupled within the base unit and configured to engage an indentation in the shank of the cutting tool substantially perpendicularly to the shank under spring bias force to removably couple the cutting tool with the base unit.

Implementations of tool holders may include one, all, or any of the following:

A sleeve may slidably coupled over the base unit and configured to slide in a direction substantially parallel with a longest dimension of the base unit; wherein the sleeve is biased toward a first end of the base unit by two or more springs.

The dowel may ride in a first slot in the base unit, the first slot having an angle of about 45 degrees with respect to the longest dimension of the base unit, and may simultaneously rides in a second slot in the sleeve, the second slot oriented about 90 degrees with respect to the longest dimension of the base unit.

The base unit may have a cavity configured to receive the shank, the cavity may include a groove extending along a longest length of the cavity, the groove may have a first edge and a second edge located where the groove intersects a circumference of the cavity, and the first edge and the second edge may be configured to press against the shank when the dowel is engaged in the indentation in the shank.

Implementations of tool holders may include: a base unit configured to receive a shank of a cutting tool; a sleeve slidably coupled over the base unit and configured to slide in a direction substantially parallel to a longest dimension of the base unit; and a dowel movably coupled within the base unit and configured to engage the shank; wherein the dowel rides in a first slot in the base unit, the first slot oriented between about 5 degrees to about 90 degrees from the longest length of the base unit and where the dowel simultaneously rides in a second slot in the sleeve and the second slot is oriented between about 70 degrees and about 100 degrees to the longest dimension of the base unit.

Implementations of tool holders may include one, all, or any of the following:

The sleeve may be biased with at least two springs towards a first end of the base unit.

The dowel may be configured to engage with an indentation in the shank in response to sliding the sleeve towards a first end of the base unit and to disengage from the indentation in response to sliding the sleeve toward a second end of the base unit.

The base unit may include a cavity configured to receive the shank, the cavity has a groove extending along a longest length of the cavity, the groove includes a first edge and a second edge located where the groove intersects a circumference of the cavity, and where the first edge and the second edge are configured to press against the shank when the dowel is engaged in the indentation in the shank.

The first slot may be oriented at about 45 degrees with respect to the longest dimension of the base unit.

Implementations of cutting tools may include: a shank formed of a right circular cylinder; a cutting portion at an end of the shank; and an asymmetric notch in a side of the shank, where the asymmetric notch is configured to engage with a dowel movably comprised within a tool holder.

Implementations of tool holders may include one, all, or any of the following:

Two faces of the asymmetric notch may be shaped like the two non-hypotenuse faces of an about 30 degree, about 60 degree, and about 90 degree triangle.

The asymmetric notch may be curved along at least one of its faces.

The cutting portion may be configured to operate like a cutting tool selected from the group consisting of a boring tool, a miniature boring tool, a reverse boring tool, a profiling tool, a retaining ring grooving tool, a miniature retaining ring grooving tool, a full radius grooving tool, a miniature full radius grooving tool, an internal threading tool, and a face grooving tool.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 2 is a side cross sectional view of the tool holder and cutting tool of FIG. 1 taken along line 2-2;

FIG. 3 is a front view of an implementation of a tool holder and cutting tool;

FIG. 7 is a close-up view of an implementation of cavity of a tool holder.

DESCRIPTION

This disclosure, its aspects and implementations, are not limited to the specific components or assembly procedures disclosed herein. Many additional components and assembly procedures known in the art consistent with the intended tool holders and cutting tools and/or assembly procedures for tool holders and cutting tools will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such tool holders and cutting tools and implementing components, consistent with the intended operation.

Figure 4:
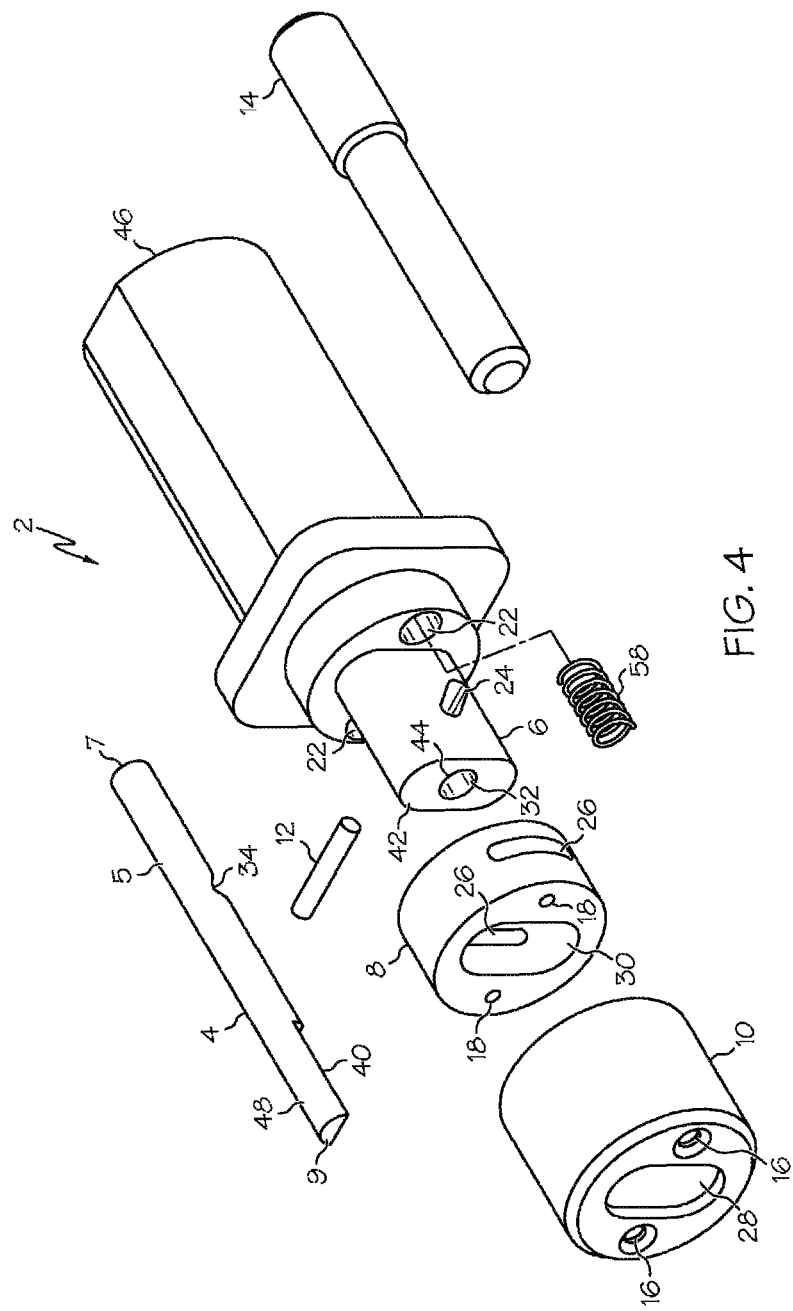
FIG. 4 is an exploded view of an implementation of a tool holder and cutting tool.

Referring now to FIG. 4, which is a perspective exploded view of a tool holder 2 and cutting tool 4, in various implementations a tool holder 2 includes a base unit 6 having a slot (first slot) 24, a sleeve 8 having a slot (second slot) 26, and a dowel or bar 12. The sleeve 8 slidably couples over the base unit 6 proximate the first end 42 of the base unit 6 at an opening 30 of the sleeve 8 so that the slot 24 and slot 26 at least partially align. The dowel 12 is slidably coupled to both the slot 24 and the slot 26. As the sleeve 8 is slid relative to the base unit 6, the dowel 12 changes its position in the slot 24 by sliding (riding) along the slot 24 and simultaneously changes its position in the slot 26 by sliding (riding) along the slot 26.

Still referring to FIG. 4, in implementations the sleeve 8 is biased towards a first end 42 of the base unit 6, opposite a second end 46, by virtue of one or more springs 58. In particular implementations there are two springs 58 and each of the springs 58 engages a spring seat 22 on the base unit 6, abuts a bottom face of the sleeve 8, and may also engage in an opening in the sleeve 8 adapted to receive an end of the spring 58.

Still referring to FIG. 4, in particular implementations the tool holder 2 may further includes a cover 10 which substantially encloses the sleeve 8. The cover 10 has an opening 28 through which the first end 42 of the base unit 6 extends. The cover 10 in the shown implementation also has two screw holes 16 which align with screw holes 18 of the sleeve 8. Two screws 20 (illustrated in FIG. 3) are used to secure the cover 10 to the sleeve 8.

The base unit 6 has a cavity 32 which has a circumference 44. The cavity 32 is configured to receive the shank 5 of the cutting tool 4. The cutting tool 4 may be any of a variety of tools used for cutting metal, plastics, or other materials, for instance, by non-limiting example, a boring tool, a miniature boring tool, a reverse boring tool, a profiling tool, a retaining ring grooving tool, a miniature retaining ring grooving tool, a full radius grooving tool, a miniature full radius grooving tool, an internal threading tool, a face grooving tool, or any other cutting tool adapted to lathing or shaping. The cutting tool 4 has a first end (non-operative end) 7 and a second end (operative end) 9, a notch (indentation) 34, and a cutting portion 48. In the illustrated implementation, the cutting portion 48 has a single cutting edge 40 and is used for metal lathing operations.

In implementations the tool holder 2 further includes a seat screw 14 which couples to the base unit 6 and abuts the first end 7 of the cutting tool 4 when the cutting tool 4 is fully installed in the tool holder 2.

Referring now to FIG. 4 and FIG. 2, in implementations when the tool holder 2 is fully assembled the sleeve 8 is biased by the springs towards the first end 42 of the base unit 6. Because the dowel rides in slot 24 in the sleeve, the dowel 12 responds to movement of the sleeve 8 and will slide simultaneously in slots 24 and 26 towards the center axis of the cylindrical cavity 32. When the cutting tool 4 is fully seated in cavity 32, the dowel 12 is thus biased toward notch 34 in the cutting tool 4 by the spring bias force applied to the sleeve 8. Under the bias applied to the dowel 12, the dowel 12 engages with the notch 34 and secures the cutting tool 4 into place, preventing it from moving in or out of the tool holder 2. The cutting tool 4 may then be used to perform various cutting procedures in normal operation.

When it is desirable to remove the cutting tool 4 or replace it with a different cutting tool 4, a user may release the cutting tool 4 by applying pressure to the sleeve 8 either directly or, in instances wherein a cover 10 is present, by applying pressure to the cover 10 and pushing the sleeve 8 towards the second end 46 of the base unit 6. This has the effect of overcoming the spring bias force applied to the sleeve 8, causing the sleeve 8 to move toward the second end 46, and correspondingly causing the dowel 12 to slide in slot 26 and simultaneously in slot 24 away from the axis of cylindrical cavity 32, thus disengaging the dowel 12 from notch 34. While maintaining the sleeve 8 in this position through pressure on the cover 10 that keeps the springs depressed, the user may then remove the cutting tool 4 from cavity 32. The user may insert another or a new cutting tool 4 into cavity 32 when the sleeve 8 is being held in a depressed position. After seating the cutting tool 4 into cavity 32 (and, in some implementations, flush against seat screw 14) the user may release pressure from the sleeve 8 (or from cover 10, accordingly), and the springs will push the sleeve 8 towards the first end 42 of the base unit 6, thus moving the dowel 12 to seat the dowel 12 in the indentation 34 and thus secure the cutting tool 4 to the base unit 6.

In various implementations, as in FIG. 4 and FIG. 2, the dowel 12 engages the shank 5 of the cutting tool 4 substantially perpendicularly to the shank 5. The sleeve 8 in this implementation is configured to slide in a direction substantially parallel with a longest dimension of the base unit 6, i.e., in a direction extending from the first end 42 of the base unit 6 to the second end 46, and vice versa. In the implementation of FIG. 4 the sleeve 8 is biased towards the first end 42 of the base unit 6 with two springs 58, but in other implementations the biasing could be accomplished with one spring 58 or with more than two springs 58. In particular implementations, the dowel 12 engages the indentation 34 of the shank 5 in response to the sleeve 8 sliding towards the first end 42 of the base unit 6 and disengages the indentation 34 in response to sliding the sleeve 8 towards the second end 46 of the base unit 6. In these implementations, the dowel 12 enters the cavity 32 in response to the sleeve 8 sliding towards the first end 42 of the base unit 6 and exits the cavity 32 in response to the sleeve 8 sliding towards the second end 46 of the base unit 6.

Figure 6:
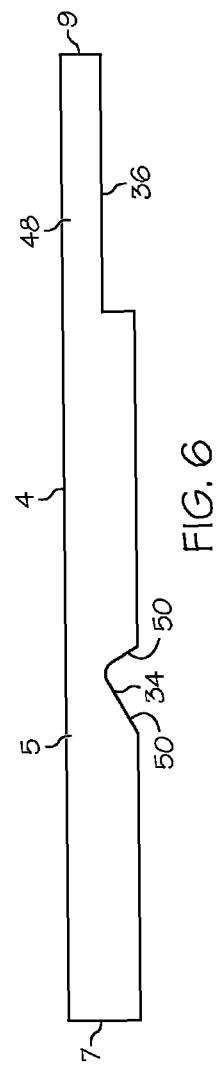
FIG. 6 is a side view of the cutting tool implementation illustrated in FIG. 5.

In other implementations not shown in the drawing the slot 24 may be oriented at an angle of about 45 degrees with respect to the longest dimension of the base unit 6 but about 90 degrees from the position of the slot 24 illustrated in FIG. 4 and the sleeve 8 may be biased, by springs or otherwise, towards the second end 46 of the base unit 6 (rather than the first end). In such an implementation when it is desirable to remove the cutting tool 4 or replace it with a different cutting tool 4, a user may release the cutting tool 4 by pulling on the sleeve 8 either directly or, in instances wherein a cover 10 is present, by pulling on the cover 10 to pull the sleeve 8 away from the second end 46 of the base unit 6. This has the effect of overcoming the bias of the sleeve 8 towards the second end 46, causing the sleeve 8 to move away from the second end 46, and correspondingly causing the dowel 12 to slide in slot 26 and simultaneously in slot 24 away from the axis of cylindrical cavity 32, thus disengaging the dowel 12 from notch 34. While maintaining the sleeve 8 in this position the user may then remove the cutting tool 4 from cavity 32. The user may insert another or a new cutting tool 4 into cavity 32 when the sleeve 8 is being held in this position. After seating the cutting tool 4 into cavity 32 the user may then release the sleeve 8 (or cover 10, accordingly), and the spring or other biasing element will move the sleeve 8 towards the second end 46 of the base unit 6, thus moving the dowel 12 to seat the dowel 12 in the indentation 34 and thus secure the cutting tool 4 to the base unit 6. In these implementations, a seat screw 14 may not be necessary in that the cutting tool 4 is prevented from moving undesirably closer to the second end 46 directly by encountering the dowel 12 in the slot 24 (the slot 24 being angled at about 90 degrees from its angle in FIG. 4). In this implementation the notch 34 may be oriented opposite its orientation in FIG. 6, i.e., the shorter face 50 closer to the first end 7 of the cutting tool 4, though in other implementations it may have the same configuration as shown in FIG. 6 and as otherwise described herein.

In the implementation illustrated in FIG. 4, the dowel 12 has the shape of a right circular cylinder. In other implementations the dowel 12 could have the shape of a triangular prism, a rectangular prism, a cuboid, a pentagonal prism, a hexagonal prism, and so forth, with the base of the prism being chosen from any of various multi-sided closed shapes including a heptagon/septagon, octagon, nonagon, decagon, hendecagon/undecagon and any other n-gon (a polygon with n sides) where n is a positive integer greater than 2. The dowel 12 may also be an irregular shape and/or could be the shape of an equilateral triangle with rounded edges and/or rounded corners, a Reuleaux triangle, an oval, ellipsoid, and so forth. The dowel 12 may also have curved, non-circular faces at its distal ends.

In the implementation of FIG. 4, slot 24 is oriented at an angle of about 45 degrees with respect to the longest dimension of the base unit 6. In other implementations slot 24 could have different angles with respect to the longest dimension of the base unit 6, ranging for example from about 5 degrees to about 90 degrees. In the implementation of FIG. 4 slot 26 is oriented at an angle of about 90 degrees with respect to the longest dimension of the base unit 6. In other implementations slot 26 could be oriented at different angles, ranging for example from about 70 degrees to about 100 degrees. Either or both of the slots 24 and 26 may be curved along their length rather than straight along their length like those slot implementations illustrated in FIG. 4. In other implementations the slots 24 and/or 26 may be angled having different widths at one end or at various points along the slots 24 and 26.

In particular implementations, the dowel 12 slides in slot 24, at an angle of about 45 degrees with respect to the longest length of the base unit 6, towards the axis of the cylindrical cavity 32, in response to the sleeve 8 sliding towards the first end 42 of the base unit 6. The dowel 12 simultaneously slides in slot 26, at an angle of about 90 degrees with respect to the longest length of the base unit 6, towards the same axis of cavity 32, in response to the same movement of the sleeve 8 towards the first end 42. This movement is reversed when the movement of the sleeve 8 is reversed.

Referring now to FIG. 7, in various implementations the cavity 32 may have a groove 52 extending along a longest length of the cavity 32 that increases the size of the cavity 32. The groove 52 has a first edge 54 and a second edge 56 located where the groove intersects the circumference 44 of the cavity 32, since the groove 52 extends from the perimeter of the cavity 32. The groove 52 may be located on a side of the cavity 32 that opposes the side of the cavity 32 that the dowel 12 enters while engaging with the cutting tool 4. The first edge 54 and second edge 56 are configured so that the shank 5 engages the first edge 54 and second edge 56 in response to the dowel 12 engaging the indentation 34 in the side of the shank 5. In such implementations, the shank 5 is held in place at three contact areas or points oriented as the vertices of a triangle with respect to each other which include the first edge 54, the second edge 56, and the dowel 12. Because of the orientation of the groove 52 directly across the cavity 32 from the dowel 12, the first edge 54 and second edge 56 are configured to press against the shank 5 when the dowel 12 is engaged in the indentation 34 in the shank 5.

Figure 1:
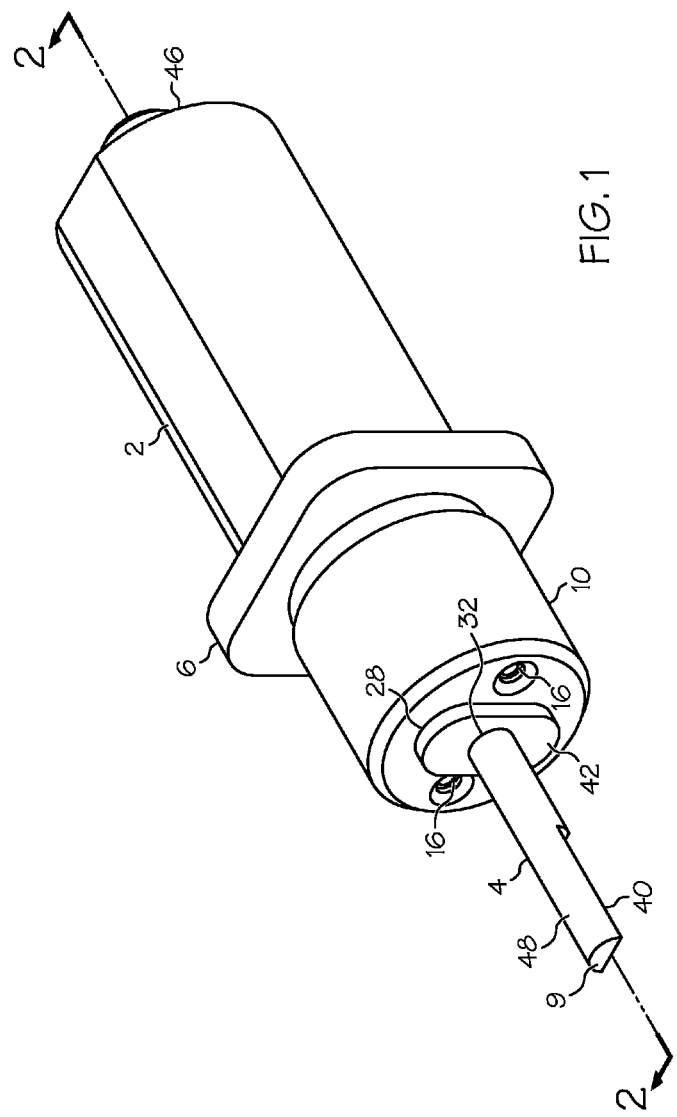
FIG. 1 is a perspective view of an implementation of a tool holder with a cutting tool coupled therein.

FIG. 1 illustrates a perspective view of an implementation of an assembled tool holder 2 with a cutting tool 4 coupled therein. The base unit 6 and cover 10 are visible, but the sleeve 8 is concealed by the cover 10. The first end 42 of the base unit 6, opposite the second end 46, can be seen extending through the opening 28 of the cover 10 and the screw holes 16 are also visible. The cutting portion 48, cutting edge 40 and second end (operative end) 9 of the cutting tool 4 are also visible extending from the cavity 32.

FIG. 2 is a side cutaway view of the tool holder 2 and cutting tool 4 of FIG. 1 taken along line 2-2. Referring now to FIG. 2, the first end 42, second end 46 and cavity 32 of the base unit 6 are seen. The seat screw 14 is visible within the base unit 6 and is seen engaging the first end 7 of the cutting tool 4 which is located in the cavity 32 of the base unit 6. In this implementation, the cutting portion 48 of the cutting tool 4 has a first planar surface 36 proximate its second end 9. In implementations the cavity 32 and shank 5 have diameters such that the cutting tool 4 is flush against roughly the entire circumference 44 of the cavity 32 along roughly the full length of the longest length of the cavity 32. In other implementations the cavity 32 has the shape of a right circular cylinder and the shank 5 has the shape of a right circular cylinder with a portion removed, thus forming for instance a second planar surface 38. In such implementations the shank 5 is generally flush against the entire circumference 44 except at the location of the second planar surface 38. This is the case, for instance, with the implementations of FIG. 2 and FIG. 3.

Referring still to FIG. 2, the slot 26 of the sleeve 8 is substantially aligned with the slot 24 of the base unit 6 which enables the insertion of the dowel into both slots. In the configuration illustrated, the dowel 12 has partially entered indentation 34 in the side of the shank 5 of the cutting tool 4. The cover 10 is seen covering the sleeve 8.

Referring now to FIG. 3, which is a front view of a tool holder 2 and cutting tool 4, the base unit 6 and cover 10 are visible. The screw holes 16 of the cover 10 can be seen, with screws 20 therein. The second end 9 of the cutting tool 4 is seen, along with an edge of the first planar surface 36. In this implementation the cutting tool 4 also has a second planar surface 38 which is substantially parallel with the first planar surface 36, and its edge is visible as well (the cutting tool 4 in this implementation is similar to the cutting tool 4 of FIG. 5).

Figure 5:
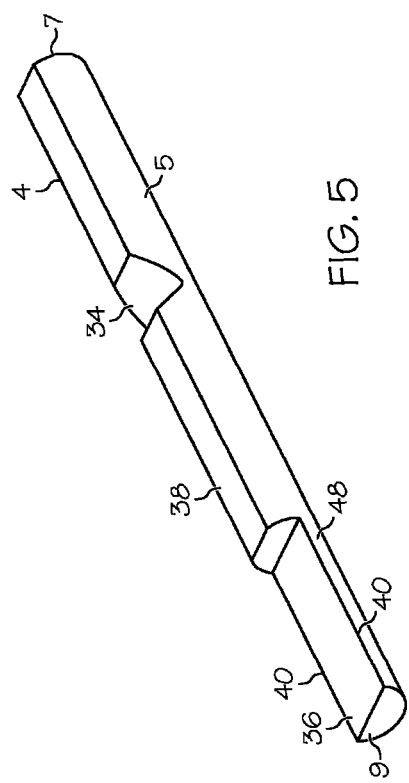
FIG. 5 is a perspective view of an implementation of a cutting tool.

FIG. 5 is a perspective view of an implementation of a cutting tool 4. In various implementations the cutting tool 4 has a first end 7 and an opposing second end 9. Proximate the second end 9 is a cutting portion 48 having a first planar surface 36 and cutting edges 40 and at the second end 9. Along the shank 5 is a second planar surface 38 substantially parallel with the first planar surface 36. A notch 34 exists in the side of the shank 5. Except for the first planar surface 36, the second planar surface 38, and the notch 34, the cutting tool 4 of this implementation has the shape of a right circular cylinder. In other implementations other cutting tool 4 shapes could be used. As described above, the second end 9 may have a shape consistent with the cutting tool 4 being, by non-limiting example, a boring tool, a miniature boring tool, a reverse boring tool, a profiling tool, a retaining ring grooving tool, a miniature retaining ring grooving tool, a full radius grooving tool, a miniature full radius grooving tool, an internal threading tool, a face grooving tool, or any other lathing or shaping tool. In particular implementations the cutting tool 4 may be a single-point or a multi-point cutting tool 4. The cutting tool 4 may be configured to perform, by non-limiting example, one or more of the following processes: turning, shaping, planning, milling, drilling, boring, profiling, grinding, grooving, threading, filing, slot cutting, rabbeting, routing, chamfering, parting, knurling, deburring and the like. In various implementations the shank 5 of the cutting tool 4 could have the shape of the shank 5 of FIG. 5 or of other implementations disclosed herein, and the cutting portion 48 could have a shape different than that of FIG. 5 but consistent with any of the aforementioned specific cutting tools 4.

FIG. 6 is a side view of an implementation of a cutting tool 4. In the implementation shown the shank 5 generally has the shape of a right circular cylinder with a notch 34 in its side, nearer the first end 7 than the second end 9. The notch 34 has two faces 50 the edges of which roughly form the two non-hypotenuse sides of an about 30-60-90 degree angled triangle. The volume of the notch 34 itself thus forms roughly the shape of a 30-60-90 degree angled triangular prism. An edge formed at the juncture of the two faces 50 is curved, though in other implementations it could be non-curved. In addition, either one or both of the two faces 50 may be curved rather than forming a flat plane. A wide variety of shapes for notch 34 are possible using the principles disclosed herein.

In implementations the notch 34 is an asymmetric notch 34, as in FIG. 6. In implementations the notch 34 may have a shape different than that of a roughly 30-60-90 degree angled triangular prism. For instance the notch 34 could have faces 50 that are symmetric. The notch 34 could therefore have roughly the shape of an equilateral triangular prism. The notch 34 could have various other roughly triangular prismatic shapes wherein the faces of the triangular prism have sides of varying lengths and wherein the roughly triangular faces have correspondingly varying internal angles.

In implementations the cavity 32 has the shape of a right circular cylinder, but in other implementations the cavity 32 may have a different shape to receive differently shaped shanks 5. For instance, a cavity 32 may be shaped to receive an implementation of a cutting tool 4 similar to that shown in FIG. 5, and in such an instance the cavity 32 may have a cross section substantially perpendicular to its longest length that is very similar to the cross section of the cutting tool 4 taken substantially perpendicular to its longest length.

In implementations the face 50 that is most parallel with the non-curved portions of the slot 24 may form a nonzero angle with respect to the non-curved portions of the slot 24. In implementations this angle may be between about 7 degrees and 17 degrees. In implementations this angle may be about 12 degrees. This angle may assist in the movement and/or retention of the dowel 12 in the slot 24 and slot 26.

In places where the description above refers to particular implementations of tool holders and cutting tools, it should be readily apparent that a number of modifications may be made without departing from the spirit thereof and that these implementations may be applied to other tool holders and cutting tools.

The invention claimed is:

1. A tool holder, comprising:
a base unit configured to receive a shank of a cutting tool;
a dowel movably coupled within the base unit and configured to engage an indentation in the shank of the cutting tool substantially perpendicularly to the shank under spring bias force to removably couple the cutting tool with the base unit; and
a sleeve slidably coupled over the base unit and configured to slide in a direction substantially parallel with a longest dimension of the base unit, wherein the base unit is at least partially received within the sleeve and wherein the sleeve is biased toward a first end of the base unit by two or more springs.

2. The device of claim 1, wherein the dowel rides in a first slot comprised in the base unit, the first slot having an angle of about 45 degrees with respect to the longest dimension of the base unit and simultaneously rides in a second slot comprised in the sleeve, the second slot oriented about 90 degrees with respect to the longest dimension of the base unit.

3. The device of claim 2, wherein the base unit comprises a cavity configured to receive the shank, the cavity comprises a groove extending along a longest length of the cavity, the groove comprises a first edge and a second edge located where the groove intersects a circumference of the cavity, and wherein the first edge and the second edge are configured to press against the shank when the dowel is engaged in the indentation in the shank.

4. A tool holder, comprising:
a base unit configured to receive a shank of a cutting tool;
a sleeve slidably coupled over the base unit and configured to slide in a direction substantially parallel to a longest dimension of the base unit, wherein the base unit is at least partially received within the sleeve; and
a dowel movably coupled within the base unit and configured to engage the shank;
wherein the dowel rides in a first slot comprised in the base unit, the first slot oriented between about 5 degrees to about 90 degrees from the longest length of the base unit and wherein the dowel simultaneously rides in a second slot comprised in the sleeve, the second slot oriented between about 70 degrees and about 100 degrees to the longest dimension of the base unit.

5. The device of claim 4, wherein the sleeve is biased with at least one spring towards a first end of the base unit.

6. The device of claim 5, wherein the dowel is configured to engage with an indentation comprised in the shank in response to sliding the sleeve towards the first end of the base unit and to disengage from the indentation in response to sliding the sleeve toward a second end of the base unit.

7. The device of claim 6, wherein the base unit comprises a cavity configured to receive the shank, the cavity comprises a groove extending along a longest length of the cavity, the groove comprises a first edge and a second edge located where the groove intersects a circumference of the cavity, and wherein the first edge and the second edge are configured to press against the shank when the dowel is engaged in the indentation in the shank.

8. The device of claim 4, wherein the first slot is oriented at about 45 degrees with respect to the longest dimension of the base unit.

* * * * *